(12) United States Patent
Snider et al.

(10) Patent No.: US 12,296,656 B2
(45) Date of Patent: May 13, 2025

(54) SEALING SYSTEM FOR MOVABLE WINDOW OF VEHICULAR REAR SLIDER WINDOW ASSEMBLY

(71) Applicant: Magna Mirrors of America, Inc., Holland, MI (US)

(72) Inventors: Darin J. Snider, Holland, MI (US); David L. Guillozet, Hamilton, MI (US); David G. Douma, West Olive, MI (US); Dino D. Zambelli, Grand Haven, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 0 days.

(21) Appl. No.: 18/443,397

(22) Filed: Feb. 16, 2024

(65) Prior Publication Data

US 2024/0181855 A1 Jun. 6, 2024

Related U.S. Application Data

(62) Division of application No. 17/303,601, filed on Jun. 3, 2021, now Pat. No. 11,912,110.

(60) Provisional application No. 62/704,970, filed on Jun. 5, 2020.

(51) Int. Cl.
*B60J 10/74* (2016.01)
*B60J 1/18* (2006.01)

(52) U.S. Cl.
CPC ............. *B60J 10/74* (2016.02); *B60J 1/1853* (2013.01)

(58) Field of Classification Search
CPC . B60J 1/1853; B60J 10/21; B60J 10/35; B60J 10/74–79; B60J 10/345; B60J 10/365
See application file for complete search history.

(56) References Cited

U.S. PATENT DOCUMENTS

| | | |
|---|---|---|
| 957,728 A | 5/1910 | Bliss |
| 1,204,702 A | 11/1916 | Schupp |
| 2,762,675 A | 9/1956 | Janows |
| 2,858,408 A | 10/1958 | Barroero |
| 2,912,714 A | 11/1959 | Rich |
| 2,962,773 A | 12/1960 | Heller |

(Continued)

FOREIGN PATENT DOCUMENTS

EP 0378419 A1 * 1/1990

*Primary Examiner* — Catherine A Kelly
*Assistant Examiner* — Patrick B. Ponciano
(74) *Attorney, Agent, or Firm* — HONIGMAN LLP

(57) ABSTRACT

A method for manufacturing vehicular slider window assembly includes providing at least one fixed window panel and a perimeter seal having elongated sealing portions joined at respective corner regions. Each of the elongated sealing portions includes a base portion, an elongated sealing lip and an attachment element. The perimeter seal is adhesively attached at the fixed window panel. The corner regions are sealed at the at least one fixed window panel via dispensing a sealant through a passageway formed at an end of the base portion of respective ones of the elongated sealing portions at the respective corner regions to fill a gap between adjacent end regions of the respective attachment elements at the respective corner regions at the surface of the at least one fixed window panel. A movable window panel is disposed at upper and lower rails of the at least one fixed window panel.

22 Claims, 8 Drawing Sheets

(56) References Cited

U.S. PATENT DOCUMENTS

| | | | |
|---|---|---|---|
| 3,177,989 A | 4/1965 | Di Chiaro | |
| 3,237,250 A | 3/1966 | Scoville | |
| 3,379,859 A | 4/1968 | Marriott | |
| 3,508,361 A | 4/1970 | Ryder | |
| 3,715,707 A | 2/1973 | Anderson | |
| 3,893,260 A | 7/1975 | Cadiou | |
| 3,898,427 A | 8/1975 | Levin et al. | |
| 3,911,245 A | 10/1975 | O'Shaughnessy | |
| 3,964,068 A | 6/1976 | Torii et al. | |
| 3,995,142 A | 11/1976 | Ciardelli et al. | |
| 4,023,008 A | 5/1977 | Durussel | |
| 4,065,848 A | 1/1978 | Dery | |
| 4,081,926 A | 4/1978 | Jardin | |
| 4,124,054 A | 11/1978 | Spretnjak | |
| 4,137,447 A | 1/1979 | Boaz | |
| 4,158,270 A | 6/1979 | Cherbourg et al. | |
| 4,171,594 A | 10/1979 | Colanzi | |
| 4,244,774 A | 1/1981 | Dery | |
| RE30,663 E | 6/1981 | Schnitzius | |
| 4,388,522 A | 6/1983 | Boaz | |
| 4,405,174 A * | 9/1983 | Yamane | B60J 10/20 296/93 |
| 4,410,843 A | 10/1983 | Sauer et al. | |
| 4,415,196 A | 11/1983 | Baum et al. | |
| 4,450,346 A | 5/1984 | Boaz | |
| 4,458,445 A | 7/1984 | Sauer et al. | |
| 4,519,443 A | 5/1985 | Sutoh et al. | |
| 4,552,611 A | 11/1985 | Dery et al. | |
| 4,568,119 A * | 2/1986 | Minami | B60J 10/35 296/93 |
| 4,606,159 A | 8/1986 | Kunert | |
| 4,611,849 A | 9/1986 | Trenkler | |
| 4,635,398 A | 1/1987 | Nakamura | |
| 4,674,231 A | 6/1987 | Radek et al. | |
| 4,723,809 A | 2/1988 | Kida et al. | |
| 4,738,052 A | 4/1988 | Yoshida | |
| 4,785,583 A | 11/1988 | Kawagoe et al. | |
| 4,883,940 A | 11/1989 | Tokarz | |
| 4,894,954 A | 1/1990 | Nozaki et al. | |
| 4,920,698 A | 5/1990 | Friese et al. | |
| 4,934,098 A | 6/1990 | Prouteau et al. | |
| 4,970,911 A | 11/1990 | Ujihara et al. | |
| 4,995,195 A | 2/1991 | Olberding et al. | |
| 5,046,283 A | 9/1991 | Compeau et al. | |
| 5,146,712 A | 9/1992 | Hlavaty | |
| 5,228,740 A | 7/1993 | Saltzman | |
| 5,245,788 A | 9/1993 | Riegelman | |
| 5,294,168 A | 3/1994 | Kronbetter | |
| 5,308,247 A | 5/1994 | Dyrdek | |
| 5,333,411 A | 8/1994 | Tschirschwitz et al. | |
| 5,345,717 A | 9/1994 | Mori et al. | |
| 5,363,596 A | 11/1994 | Kronbetter | |
| 5,367,827 A | 11/1994 | Tajima et al. | |
| 5,442,880 A | 8/1995 | Gipson | |
| 5,466,911 A | 11/1995 | Spagnoli et al. | |
| 5,467,560 A | 11/1995 | Camp et al. | |
| 5,473,840 A | 12/1995 | Gillen et al. | |
| 5,478,132 A * | 12/1995 | Gold | B60J 10/70 52/204.591 |
| 5,505,023 A | 4/1996 | Gillen et al. | |
| 5,522,191 A | 6/1996 | Wenner et al. | |
| 5,525,401 A | 6/1996 | Hirmer | |
| 5,531,046 A | 7/1996 | Kollar et al. | |
| 5,542,214 A | 8/1996 | Buening | |
| 5,572,376 A | 11/1996 | Pace | |
| 5,613,323 A | 3/1997 | Buening | |
| 5,617,675 A | 4/1997 | Kobrehel | |
| 5,711,112 A | 1/1998 | Barten et al. | |
| 5,716,536 A | 2/1998 | Yokoto et al. | |
| 5,724,769 A | 3/1998 | Cripe et al. | |
| 5,724,771 A | 3/1998 | Gipson | |
| 5,784,833 A | 7/1998 | Sponable et al. | |
| 5,799,444 A | 9/1998 | Freimark et al. | |
| 5,799,449 A | 9/1998 | Lyons et al. | |
| 5,822,922 A | 10/1998 | Grumm et al. | |
| 5,836,110 A | 11/1998 | Buening | |
| 5,853,895 A | 12/1998 | Lewno | |
| 5,890,321 A | 4/1999 | Staser et al. | |
| 5,953,887 A | 9/1999 | Lucas et al. | |
| 5,996,284 A | 12/1999 | Freimark et al. | |
| 5,997,793 A | 12/1999 | Lahnala | |
| 6,014,840 A | 1/2000 | Ray et al. | |
| 6,026,611 A | 2/2000 | Ralston et al. | |
| 6,038,819 A | 3/2000 | Klein | |
| 6,086,138 A | 7/2000 | Xu et al. | |
| 6,112,462 A | 9/2000 | Kolar | |
| 6,119,401 A | 9/2000 | Lin et al. | |
| 6,119,402 A | 9/2000 | Wisner | |
| 6,125,585 A | 10/2000 | Koneval et al. | |
| 6,161,894 A | 12/2000 | Chapman | |
| 6,223,470 B1 | 5/2001 | Millard et al. | |
| 6,225,904 B1 | 5/2001 | Jaffe et al. | |
| 6,293,609 B1 | 9/2001 | Xu et al. | |
| 6,324,788 B1 | 12/2001 | Koneval et al. | |
| 6,328,243 B1 | 12/2001 | Yamamoto | |
| 6,393,766 B2 | 5/2002 | Nozaki et al. | |
| 6,490,832 B1 | 12/2002 | Fischbach et al. | |
| 6,525,659 B2 | 2/2003 | Jaffe et al. | |
| 6,591,552 B1 | 7/2003 | Rasmussen | |
| 6,598,931 B2 | 7/2003 | Tamura | |
| 6,691,464 B2 | 2/2004 | Nestell et al. | |
| 6,742,819 B2 | 6/2004 | So et al. | |
| 6,766,617 B2 | 7/2004 | Purcell | |
| 6,783,171 B2 | 8/2004 | Teishi et al. | |
| 6,955,009 B2 | 10/2005 | Rasmussen | |
| 7,003,916 B2 * | 2/2006 | Nestell | E05D 15/0621 49/125 |
| 7,010,883 B2 | 3/2006 | Jaerpsten et al. | |
| 7,014,251 B1 | 3/2006 | Husk | |
| 7,051,478 B2 | 5/2006 | Bourque et al. | |
| 7,073,293 B2 | 7/2006 | Galer | |
| 7,155,863 B2 | 1/2007 | Daniel et al. | |
| 7,184,190 B2 | 2/2007 | McCabe et al. | |
| 7,186,118 B2 | 3/2007 | Hansen et al. | |
| 7,219,470 B2 | 5/2007 | Lahnala | |
| 7,255,451 B2 | 8/2007 | McCabe et al. | |
| 7,259,359 B2 | 8/2007 | Davey et al. | |
| 7,395,631 B2 | 7/2008 | Lahnala | |
| 7,400,435 B2 | 7/2008 | Byers et al. | |
| 7,437,852 B2 | 10/2008 | Dufour et al. | |
| RE40,636 E * | 2/2009 | Weinert | B60J 1/1853 296/146.16 |
| 7,608,949 B2 | 10/2009 | Busch | |
| 7,626,749 B2 | 12/2009 | Baur et al. | |
| RE41,502 E | 8/2010 | Neaux | |
| 7,871,272 B2 | 1/2011 | Firman, II et al. | |
| 7,900,863 B1 | 3/2011 | Cheng | |
| 7,934,342 B2 | 5/2011 | Lahnala | |
| 7,963,070 B2 | 6/2011 | Recker | |
| 8,042,664 B2 | 10/2011 | Rutkowski et al. | |
| 8,069,615 B2 | 12/2011 | Heiman et al. | |
| 8,127,498 B2 | 3/2012 | Lahnala | |
| 8,151,519 B2 | 4/2012 | Bello et al. | |
| 8,250,812 B2 | 8/2012 | Hebert et al. | |
| 8,272,168 B2 | 9/2012 | Lahnala | |
| 8,402,695 B2 | 3/2013 | Smith et al. | |
| 8,881,458 B2 | 11/2014 | Snider et al. | |
| 8,915,018 B2 | 12/2014 | Snider | |
| 9,242,533 B2 | 1/2016 | Snider et al. | |
| 9,475,364 B2 * | 10/2016 | Tooker | B60J 10/21 |
| 9,894,717 B2 | 2/2018 | Ash, Jr. et al. | |
| 10,023,026 B2 | 7/2018 | Snider et al. | |
| 10,239,397 B2 | 3/2019 | Snider et al. | |
| 10,501,977 B2 | 12/2019 | Snider et al. | |
| 11,912,110 B2 * | 2/2024 | Snider | B60J 10/74 |
| 11,938,793 B2 * | 3/2024 | Snider | B29C 45/0053 |
| 12,043,092 B2 * | 7/2024 | Tooker | B60J 10/45 |
| 12,043,093 B2 * | 7/2024 | Haupt | B60J 10/76 |
| 12,065,023 B2 * | 8/2024 | Snider | B60J 1/1853 |
| 2003/0074842 A1 | 4/2003 | Eckhardt et al. | |
| 2003/0140562 A1 | 7/2003 | Staser et al. | |
| 2003/0188487 A1 | 10/2003 | Rasmussen | |
| 2003/0188490 A1 | 10/2003 | Kraus et al. | |

(56) References Cited

U.S. PATENT DOCUMENTS

| | | | |
|---|---|---|---|
| 2003/0213179 A1* | 11/2003 | Galer | B60J 1/1861 49/413 |
| 2004/0020131 A1 | 2/2004 | Galer et al. | |
| 2004/0065017 A1 | 4/2004 | Priest et al. | |
| 2004/0065018 A1 | 4/2004 | Regnier et al. | |
| 2005/0073172 A1 | 4/2005 | Weinert et al. | |
| 2006/0032140 A1 | 2/2006 | Arimoto et al. | |
| 2006/0061008 A1 | 3/2006 | Karner et al. | |
| 2006/0107600 A1 | 5/2006 | Nestell et al. | |
| 2006/0130405 A1 | 6/2006 | Hemond et al. | |
| 2006/0175762 A1 | 8/2006 | Barnett et al. | |
| 2007/0157522 A1 | 7/2007 | Hebert et al. | |
| 2007/0209283 A1 | 9/2007 | Ostrowski et al. | |
| 2007/0277443 A1 | 12/2007 | Dery et al. | |
| 2008/0122262 A1 | 5/2008 | Cicala | |
| 2008/0127563 A1 | 6/2008 | Tooker | |
| 2008/0155902 A1 | 7/2008 | Kaiser | |
| 2008/0202032 A1 | 8/2008 | Loidolt | |
| 2009/0019778 A1 | 1/2009 | Lahnala | |
| 2009/0322705 A1 | 12/2009 | Halsey, IV | |
| 2010/0107505 A1 | 5/2010 | Schreiner et al. | |
| 2010/0122497 A1 | 5/2010 | Lahnala | |
| 2010/0146859 A1 | 6/2010 | Gipson et al. | |
| 2010/0154312 A1 | 6/2010 | Gipson et al. | |
| 2010/0182143 A1 | 7/2010 | Lynam | |
| 2010/0240229 A1 | 9/2010 | Firman, II et al. | |
| 2010/0263290 A1 | 10/2010 | Pawloski et al. | |
| 2011/0030276 A1 | 2/2011 | Smith et al. | |
| 2011/0233182 A1 | 9/2011 | Baranski | |
| 2012/0091113 A1 | 4/2012 | Bennett et al. | |
| 2012/0091114 A1 | 4/2012 | Ackerman et al. | |
| 2012/0117880 A1 | 5/2012 | Lahnala et al. | |
| 2012/0139289 A1 | 6/2012 | Lahnala | |
| 2013/0174488 A1 | 7/2013 | Snider et al. | |
| 2013/0255156 A1 | 10/2013 | Snider | |
| 2013/0277352 A1 | 10/2013 | Degen et al. | |
| 2013/0283693 A1 | 10/2013 | Huizen et al. | |
| 2014/0047772 A1 | 2/2014 | Hulst | |
| 2014/0091074 A1 | 4/2014 | Lisinski et al. | |
| 2014/0230333 A1* | 8/2014 | Lahnala | E06B 7/14 49/408 |
| 2015/0101254 A1 | 4/2015 | Tooker et al. | |
| 2016/0135250 A1 | 5/2016 | Snider et al. | |
| 2017/0144524 A1 | 5/2017 | Snider et al. | |
| 2019/0383084 A1 | 12/2019 | Snider et al. | |
| 2020/0290443 A1 | 9/2020 | Snider et al. | |

* cited by examiner

SEALING SYSTEM FOR MOVABLE WINDOW OF VEHICULAR REAR SLIDER WINDOW ASSEMBLY

CROSS REFERENCE TO RELATED APPLICATIONS

The present application is a division of U.S. patent application Ser. No. 17/303,601, filed Jun. 3, 2021, now U.S. Pat. No. 11,912,110, which claims the filing benefits of U.S. provisional application Ser. No. 62/704,970, filed Jun. 5, 2020, which is hereby incorporated herein by reference in its entirety.

FIELD OF THE INVENTION

The present invention relates to a window assembly for a vehicle and, more particularly, a rear slider window assembly for a vehicle and, more particularly, a rear slider window assembly for a pickup truck or the like.

BACKGROUND OF THE INVENTION

It is known to provide a slider window assembly for an opening of a vehicle, such as a rear slider window assembly for a rear opening of a pickup truck. Conventional slider window assemblies for rear openings of trucks or the like typically include two or more panels, such as one or two fixed window panels and a slidable window panel. The slidable window panel is supported by rails and may be moved along the rails to open and close the window. The slidable window panel may be manually moved or may be driven or moved by a cable drive system.

SUMMARY OF THE INVENTION

The present invention provides a vehicular rear slider window assembly that has a perimeter seal for sealing the movable window panel relative to at least one fixed window panel when the movable window panel is closed. The perimeter seal comprises elongated sealing portions with corner sealing tabs or lips molded or formed at the ends of respective elongated sealing portions. At least some of the sealing portions include a passageway at an end thereof for dispensing or injecting a sealant into the corner regions to fill and seal a gap present between adjacent ends of the attachment elements that attach the respective sealing portions to the at least one fixed window panel. The assembly process of the window assembly includes dispensing the sealant (such as via a dispensing device) into the passageways so that the sealant flows into and seals within the gaps.

These and other objects, advantages, purposes and features of the present invention will become apparent upon review of the following specification in conjunction with the drawings.

DESCRIPTION OF THE PREFERRED EMBODIMENTS

Figure 1:
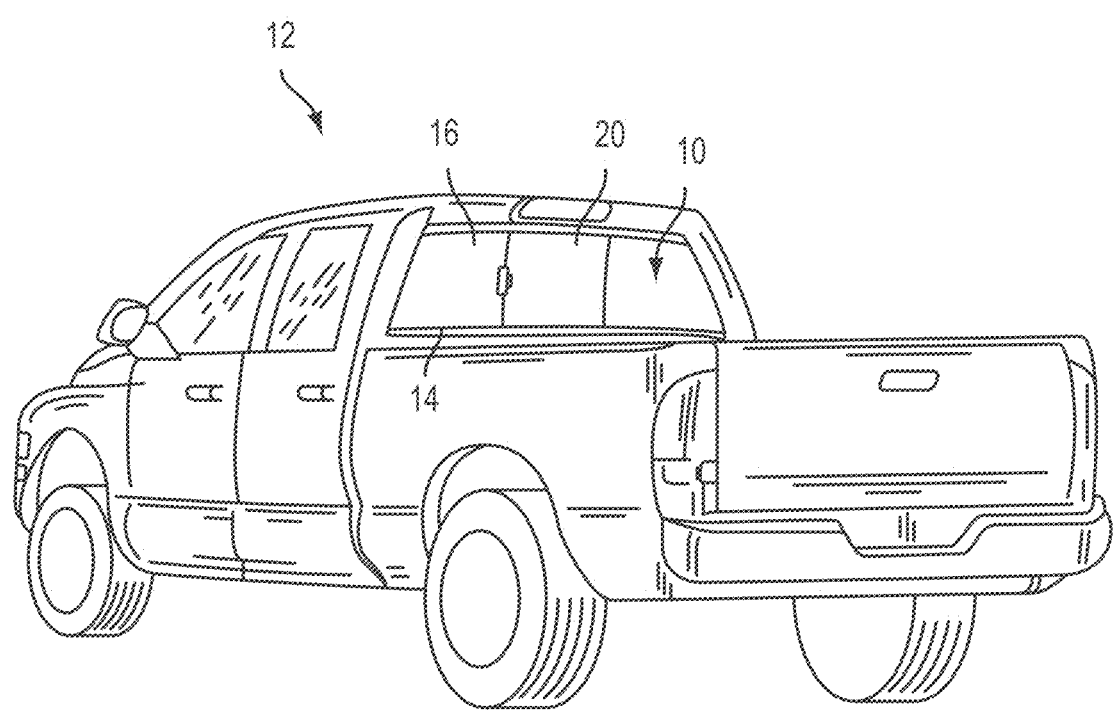
FIG. 1 is a rear perspective view of a pickup truck having a rear slider window assembly in accordance with the present invention.
Figure 2:
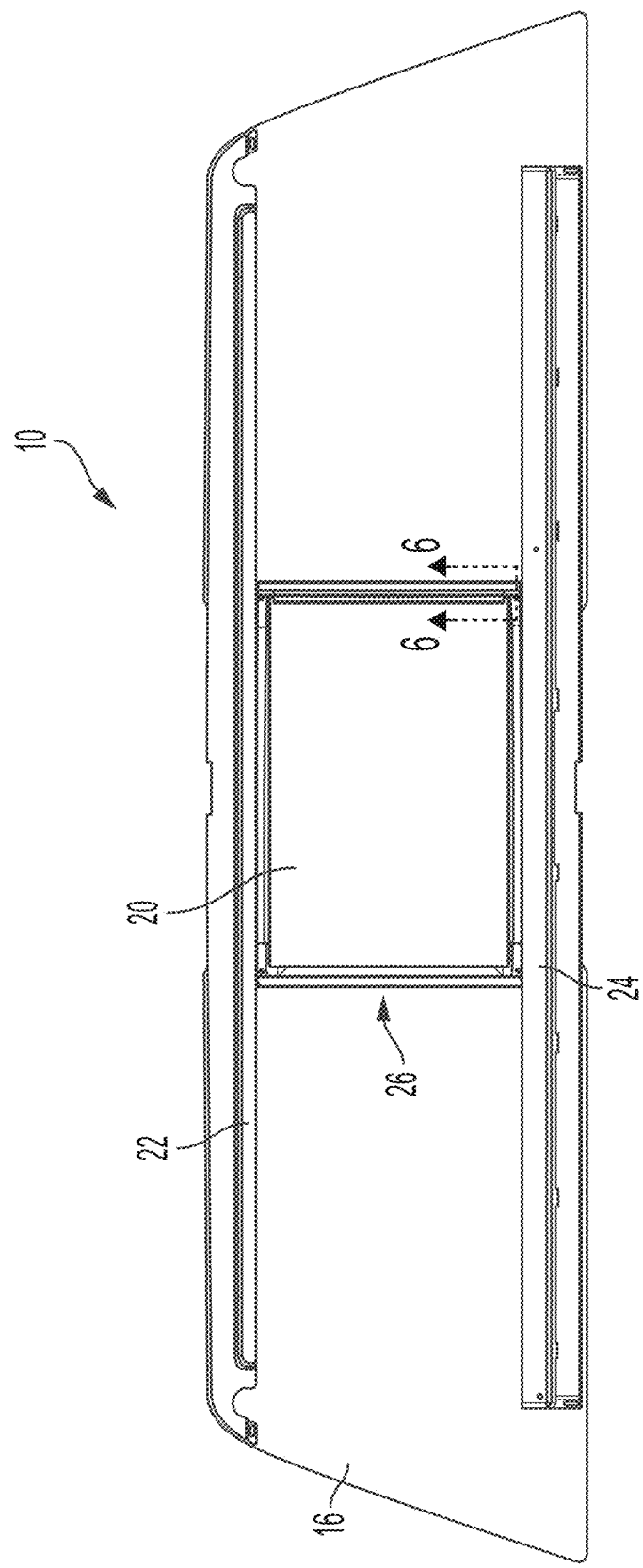
FIG. 2 is a plan view of the rear slider window assembly, as viewed from inside the vehicle.

Referring now to the drawings and the illustrative embodiments depicted therein, a rear slider window assembly 10 of a vehicle 12 (such as a pickup truck or the like) includes a fixed window panel 16 (or a pair of side fixed window panels or fixed window panel portions) having an opening established therethrough, and a movable window panel 20 that is movable relative to a frame portion or frame or rails 14 and the fixed window panel 16 between an opened position and a closed position (FIGS. 1 and 2). The rails include an upper rail 22 and a lower rail 24, with the upper and lower edge regions of the movable window panel 20 (FIG. 1) movably or slidably received in and along the respective upper and lower rails 22, 24. The window assembly 10 includes a perimeter seal 26 disposed at the fixed window panel and around a window opening or aperture established between the side panel portions of the fixed window panel 16. When the movable window panel is closed, the perimeter seal 26 seals against a perimeter region of the surface of the movable window panel that faces the fixed window panel. The perimeter seal 26 includes an aperture or hole 27 at each corner region to allow for injection of sealant into the corner region at the seal-to-window attachment interface to provide enhanced sealing at the corner regions where gaps may be present at the attachment interface, as discussed below.

In the illustrated embodiment, the window assembly comprises two fixed window panels or panel portions that are spaced apart so as to define an opening therebetween, with upper and lower appliqués or trim or filler panels or elements 119a, 119b (FIG. 8) disposed at the upper and lower regions of the opening and between the fixed window panels. Optionally, the window assembly may comprise a hole-in-glass window configuration, where the single fixed glass panel has an aperture or hole or opening established therethrough to define separate spaced apart fixed window panels or panel portions. The window assembly may utilize aspects of the window assemblies described in U.S. Pat. Nos. 8,915,018 and/or 8,881,458, and/or U.S. Publication No. US-2003-0213179, which are all hereby incorporated herein by reference in their entireties. The perimeter seal may utilize aspects of the sealing systems described in U.S. Pat. Nos. 10,239,397; 9,475,364 and/or 9,242,533, and/or U.S. Publication No. US-2020-0290443, which are hereby incorporated herein by reference in their entireties.

The upper and lower rails 22, 24 may comprise any suitable channel or rail element configured to slidably receive an upper or lower edge portion of the movable window panel. The movable window panel 20 is movable along the lower rail 24 and the upper rail 22 of the frame portion 14 to open and close the aperture or opening, such as in a manner similar to known slider window assemblies. The movable window panel 20 may include or may be disposed at a lower carrier, which may receive the lower perimeter edge region of the slider window panel 20 therein and is slidably or movably received in the channel portion of the lower rail 24 of frame portion 14. The rails and window assembly may utilize aspects of the rails and window assemblies described in U.S. Pat. No. 10,023,026, which is hereby incorporated herein by reference in its entirety.

Figure 3:
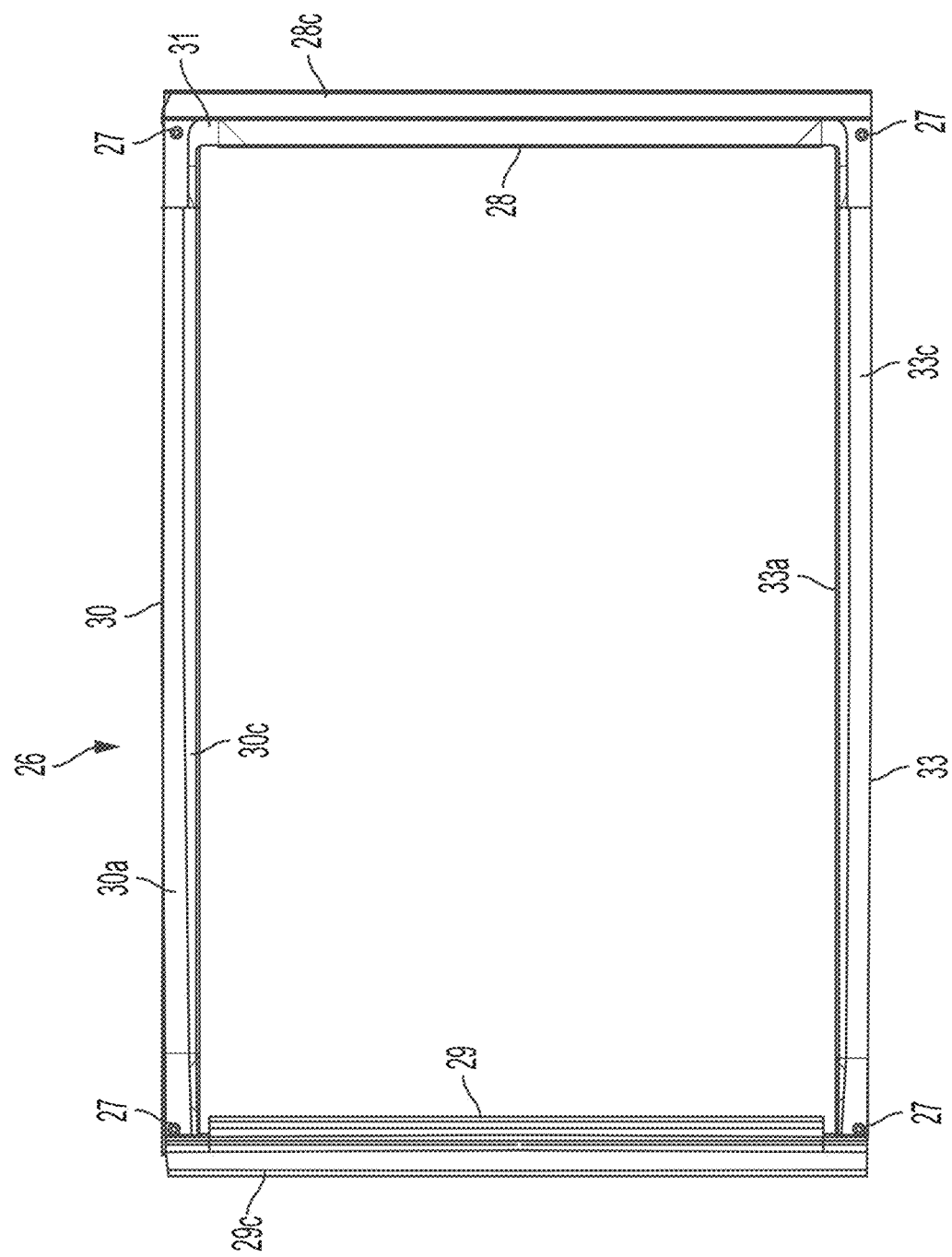
FIG. 3 is a plan view of the perimeter seal.

As shown in FIG. 3, the perimeter seal 26 comprises a continuous seal having elongated sealing portions, including side legs or portions 28, 29 and upper and lower legs or portions 30, 33. Each of the elongated sealing legs or portions 28, 29, 30, 33 has a respective elongated body portion or base portion 28a, 29a, 30a, 33a that has an attachment surface or element or portion 28b, 29b, 30b for attaching at a side or surface of the fixed window panel or panels and at rail attachment portions at the upper and lower appliqués and around the opening. For example, the attachment element may comprise an adhesive strip established along the body portion of the respective elongated sealing leg for adhesively attaching the perimeter seal 26 to the fixed window panels around the opening (such as to portions of the side or surface of the fixed window panel that have a darkened or opaque or non-light-transmissive coating established thereat).

Figure 5:
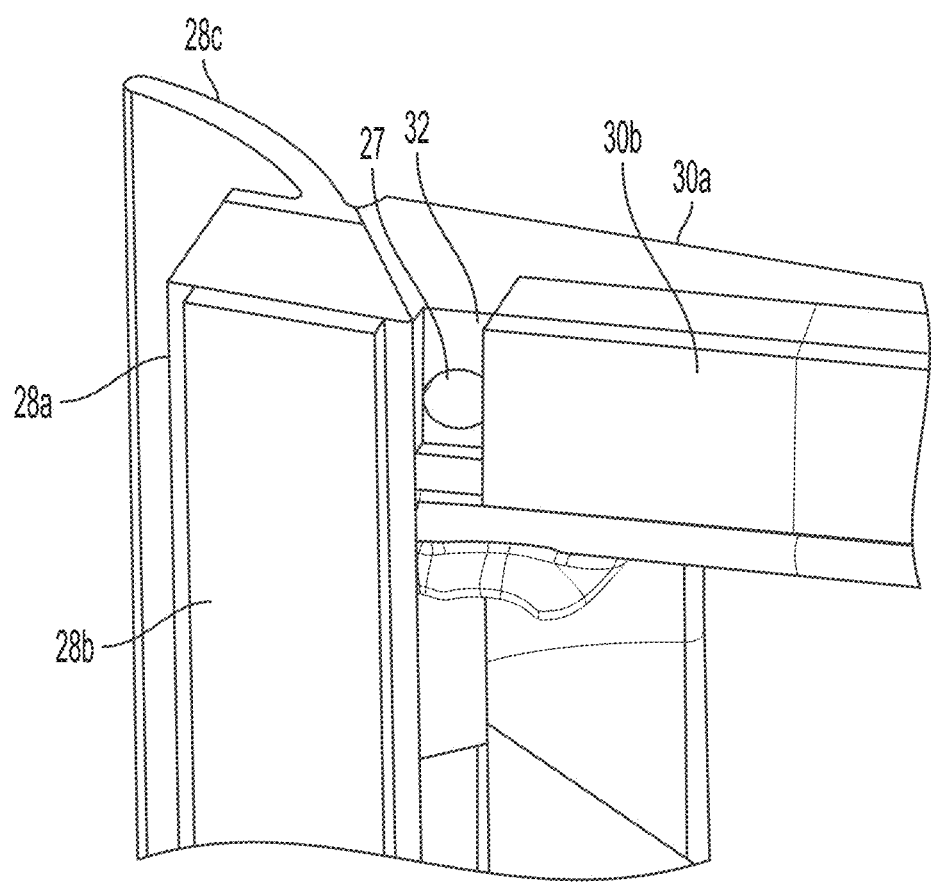
FIG. 5 is an enlarged perspective view of the outer facing side of the corner region of the perimeter seal.
Figure 8:
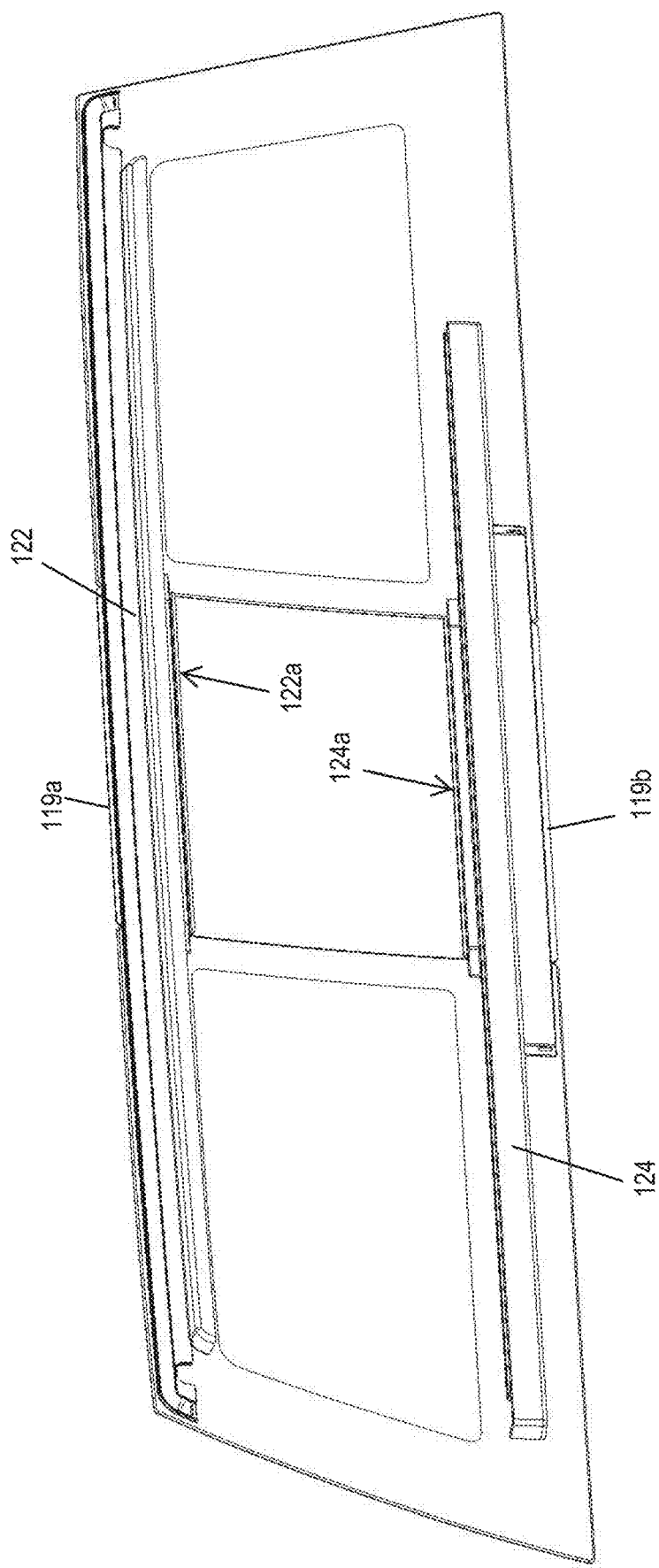
FIG. 8 is a perspective view of another rear slider window assembly that includes the perimeter seal

In the illustrated embodiment (and such as shown in FIG. 5), the attachment surfaces 28b, 29b, 30b comprise an adhesive tape that may be pressed against the window panel and against the rail attachment portion along the upper and lower legs to adhesively attach the seal 26 to the window panel around the aperture (optionally, the attachment surfaces may comprise a recessed surface that receives a bead of adhesive therein and that includes side walls that set the bond-line thickness of the adhesive at the window panel surface at which the perimeter seal is attached). The perimeter seal thus may be adhered or otherwise attached to the surface of the fixed window panel (with the adhesive strip attached at the back of the elongated body portion and having a removable film or cover that is removed to expose the adhesive for attaching at the window panel) around the opening (and optionally to a surface of a rail attachment portion 122a, 124a of the upper and/or lower rails 122, 124 that attaches the upper and/or lower rails to the window panel) so as to circumscribe the opening or aperture (or, for two fixed window panel configurations, the perimeter seal may be adhered or otherwise attached to the surfaces of the fixed window panels and to the upper and lower appliqués 119a, 119b and/or to portions of the upper and lower rails so as to circumscribe the opening, such as shown in FIG. 8).

Each of the elongated legs or portions 28, 29, 30, 33 of the perimeter seal 26 has a respective seal configuration comprising a respective sealing lip 28c, 29c, 30c, 33c established along and optionally formed or extruded with the base portion 28a, 29a, 30a, 33a. The sealing lips 28c, 29c, 30c, 33c are configured to engage and seal against the movable window panel when the perimeter seal is disposed at the fixed window panel (so as to circumscribe the opening) and the movable window panel is disposed at the opening in a closed position.

Figure 4:
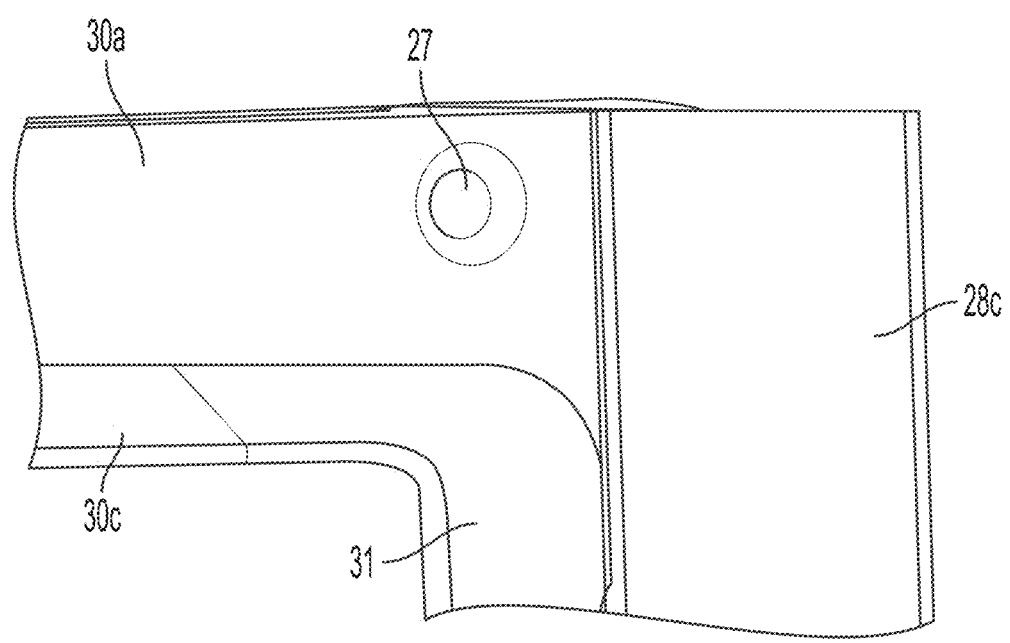
FIG. 4 is an enlarged perspective view of the inner facing side of a corner region of the perimeter seal.

Thus, the base portions 28a, 29a, 30a, 33a of the elongated portions 28, 29, 30, 33 include an attachment surface 28b, 29b, 30b at and along a first side and a sealing lip 28c, 29c, 30c, 33c at and along a second side opposite the first side. The attachment surfaces enable the perimeter seal 26 to be attached (at the first side of the perimeter seal) at the fixed window panel 16 and to receive the movable window panel 20 and provide a seal at the movable window panel via the second side of the perimeter seal. When disposed at the fixed window panel and rail attachment portions and/or upper and lower appliqués, the perimeter seal circumscribes the opening with the elongated side portions providing vertical seal portions at opposite sides of the opening and the elongated upper and lower portions providing horizontal seal portions at the top and bottom of the opening respectively. Also, the legs or seal portions 28, 29, 30, 33 may have their end regions joined to adjacent end regions of adjacent ones of the other sealing legs or portions via respective corner sealing elements 31, which may provide continuity between the respective sealing lips 28c, 29c, 30c, 33c of the side, upper, and lower seal portions (FIG. 4).

The perimeter seal 26 may comprise a unitarily formed seal that is formed via a multi-shot molding process. For example, the perimeter seal may be formed via a two (or more) shot injection molding process, which molds (such as via a plastic injection molding process) the base portions 28a, 29a, 30a, 33a during a first molding process or first shot, and which molds (such as via a plastic injection molding process) the sealing lips 28c, 29c, 30c, 33c along the respective base portions during a second molding process or second shot. For example, the base portions may be injection molded out of a rigid polypropylene material or the like, and the sealing lips may be overmolded along the base portions using a soft rubber material (such as a thermoplastic elastomer or Santoprene rubber material or the like). Optionally, the base portion and/or the sealing lips may comprise extruded elements, with the corner sections overmolded to join the extruded elongated sealing elements together.

The seal portions 28, 29, 30, 33 provide a desired sealing lip configuration for their particular application or position or orientation relative to the movable window panel. For example, one vertical seal portion 29 (i.e., one of the elongated side sealing portions) is at the side of the window opening at which the movable window panel will slide along as it is opened and closed, and thus may have a sealing lip configuration (e.g., a Y-shaped sealing lip configuration) that seals against the window panel as it is moved in either direction, while the other vertical seal portion 28 is at the opposite side of the window opening, where the movable window panel will be moved to when it is closed, and thus may have a sealing lip configuration that is configured for engagement with the window panel during only small movement of the window panel, and the upper and lower seal portions may have single flexible sealing lips that are configured to seal against the surface of the window panel as the window panel moves in a longitudinal direction along the seal portions.

Figure 6:
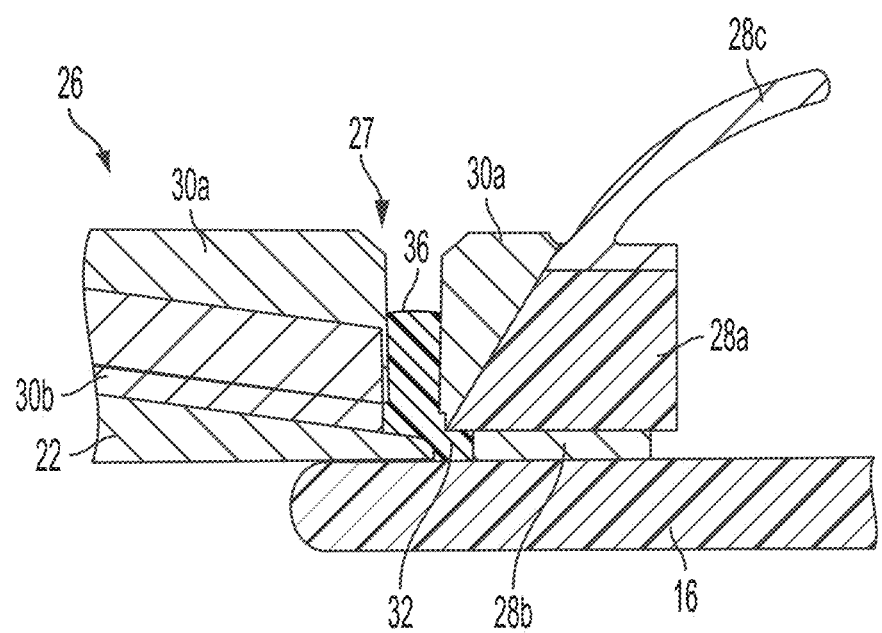
FIG. 6 is a sectional view of the perimeter seal and window at the corner region.

As can be seen with reference to FIG. 5, the base portions 28a, 29a, 30a, 33a of the sealing legs join are aligned at the corner regions of the perimeter seal and the attachment elements or surfaces 28b, 29b, 30b may have a gap 32 between adjacent ends at each of the corner regions. Thus, while the attachment elements 28b, 29b, 30b maintain a substantially continuous seal circumscribing the opening in the window panel (i.e., the attachment element provides a portion of the perimeter seal in substantially continuous contact around the opening), the gaps 32 at the corner regions (between the attaching portions) comprise a portion of the perimeter seal that is not in direct contact with the surface of the window panel. The perimeter seal 26 includes the holes or apertures 27 at the corner regions and at the gaps 32 so that a sealant 36 may be injected through the holes 27 to fill the gap 32 with the perimeter seal disposed at the surface of the window. As shown in FIG. 6, the hole 27 is formed through the body or base portion 30a, 33a of the upper and lower seal portions 30, 33 and terminates at the gap 32 between the end regions of the attachment elements or surfaces or tape 28b, 29b, 30b (e.g., between an end of one element 30b and a side of the end region of the other element 28b).

Figure 7:
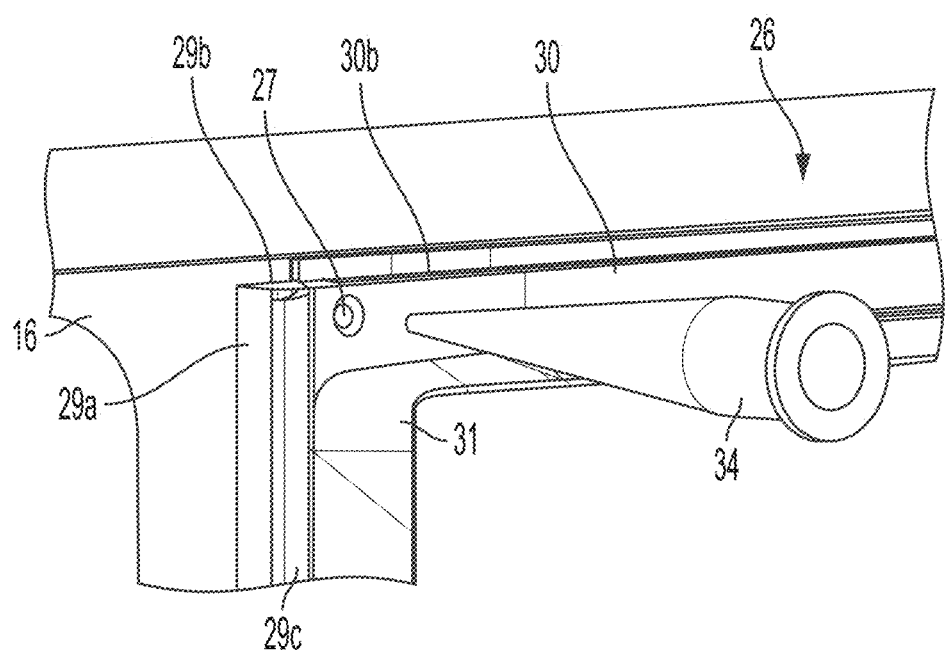
FIG. 7 is a perspective view of another corner region of the perimeter seal, shown with a sealant injecting element disposed at the aperture through the seal.

As can also be seen with reference to FIG. 6, the upper and lower seal portions may attach at the rail attachment portion of the respective upper and lower rails 22, 24, which results in the end regions of the upper/lower sealing member and the side sealing member attaching at surfaces at different levels. For example, the elongated upper/lower sealing member disposed at the respective upper/lower rail may be raised or offset from the glass surface relative to the elongated side sealing member disposed at the glass surface of the window. The gap thus includes a gap between the adjacent ends of the attachment elements 28b, 29b, 30b and between the rail attachment portion and the attachment element of the elongated side sealing portion 28b, 29b that attaches at the glass surface of the fixed window panel. In the illustrated embodiment, the holes are formed at both end regions of each of the upper and lower seal portions, but could be formed through the end regions of the side seal portions. As shown in FIG. 7, the aperture or hole 27 may have a tapered opening or port at an access side of the perimeter seal (the side opposite of the side of the perimeter seal that attaches to the fixed window panel) to ease alignment and insertion or partial insertion of a sealant injection nozzle or tool 34 at the hole 27.

Thus, during assembly of the window assembly, the perimeter seal is adhered to the fixed glass window panels (such as by removing the film from the adhesive tape and pressing the seal and tape against the inner surface of the fixed window panels) and may be adhered to the upper and lower appliqués (if applicable) and/or to the rail attachment portion of the upper rail and/or lower rail. The perimeter seal is attached to the respective surfaces such that the attachment elements 28b, 29b, 30b provide a seal surrounding the opening in the window panel that is continuous except for gaps 32 that may be present between the attachment elements in the corner regions of the perimeter seal. After the perimeter seal is attached at the surfaces, the sealant is injected into each of the holes 27 to flow through the hole or passageway and to fill the gaps 32 between the attachment surfaces or elements 28b, 29b, 30b. The sealant injection tool may be robotically controlled and may move the injection nozzle partially into the hole and inject a predetermined or appropriate amount of sealant into the hole. The amount of sealant is determined depending on the particular window assembly and typical gap between the attachment elements, such that enough sealant is measured or metered and dispensed or injected into the gap but not so much that the sealant flows out of the gap onto a visible portion of the window panel.

Thus, the perimeter seal of the present invention may be formed to provide a continuous perimeter seal about an opening of a rear slider window assembly (or other type of window assembly). The elongated sealing legs or portions may comprise extruded sealing elements that are extruded or otherwise formed of a flexible rubber material (or any suitable sealing material). The corners or junctions of the sealing legs may be molded or joined together (such as at the base portions 28a, 29a, 30a, 33a) and an additional sealing lip may be provided or established at the corner region (such as by overmolding the additional sealing lip (such as via injection molding or the like) as part of the sealing lips at the end regions of the vertical sealing leg so as to limit water intrusion at the corner regions. The corner regions between adjacent ends of respective elongated sealing legs or portions include gaps between the attachment elements of the sealing portions, into which a sealant can be injected through a hole at each corner region, whereby the sealant fills the gaps and seals the perimeter seal against the window panel or panels (and optionally the appliqués and/or rail attachment portions as well) around the entire periphery of the perimeter seal. Each corner region includes a respective hole, even though a gap may not be present at each of the corner regions (such as in situations where the base portions abut one another at the respective corner region). The perimeter seal is attached or adhered to the glass surface of the fixed window panel so that the perimeter seal provides a continuous sealing lip about its periphery and fully circumscribes the opening of the window with a continuous sealing lip and is fully sealed at the window panel or panels around the opening. Thus, the present invention provides for enhanced sealing at the window seal with filled gaps or no gaps or leaks between sealing lips or attachment elements around the window opening.

The movable or slider window panel 20 is thus movable between its opened and closed positions and along the sealing elements, which maintain sealing engagement with the window panel as it moves along the rails 22, 24 of the window assembly. The movable window panel may be movable via any suitable means, such as via manual pushing or pulling at the window panel and/or in response to actuation of a drive motor of a drive motor assembly or system, which may move cables or wires of cable assemblies relative to a sheath of the cable assemblies or the like to impart horizontal movement of the slider window panel 20 along the rails 22, 24. Optionally, the drive motor assembly may utilize aspects of the drive assemblies of the types described in U.S. Pat. Nos. 4,920,698; 4,995,195; 5,146,712; 5,531,046; 5,572,376; 6,955,009 and/or 7,073,293, and/or U.S. Publication Nos. US-2019-0383084; US-2004-0020131 and/or US-2008-0127563, which are all hereby incorporated herein by reference in their entireties.

Although shown and described as a horizontally movable center window that moves relative to a pair of opposite side windows (such as for applications at the rear of a cab of a pickup truck or the like), it is envisioned that the present invention is applicable to other types of movable window assemblies, such as horizontally movable window panels that move relative to a single fixed window panel and/or frames (such as for a rear or side opening of a vehicle or the like), and/or such as vertically movable window panels that move relative to one or more fixed panels and/or frames (such as for a rear or side opening of a vehicle or the like), while remaining within the spirit and scope of the present invention.

Optionally, the fixed window panel and movable window panel of the window assembly of the present invention may include one or more electrically conductive elements, such as heater grids or the like, which may be powered utilizing aspects of the window assemblies described in U.S. Pat. Nos. 8,402,695 and/or 8,881,458, which are hereby incorporated herein by reference in their entireties. The window assembly may include a heater grid on each of the fixed window panels and on the movable window panels, with a heating system that provides power to the heater grid on the movable window panel irrespective of the position of the movable window panel relative to the fixed window panel and throughout the range of movement of the movable window panel between its opened and closed positions, such as by utilizing aspects of the window assemblies described in U.S. Pat. Nos. 8,402,695 and/or 8,881,458, incorporated above.

Optionally, the window assembly or assemblies of the present invention may utilize aspects of the window assemblies described in U.S. Pat. Nos. 8,915,018; 8,881,458; 8,402,695; 7,073,293; 7,003,916; 6,119,401; 6,026,611; 5,996,284; 5,799,444 and/or 6,691,464, and/or U.S. Publication Nos. US-2014-0047772; US-2006-0107600; US-2008-0127563; US-2004-0020131 and/or US-2003-0213179, all of which are hereby incorporated herein by reference in their entireties.

Changes and modifications to the specifically described embodiments may be carried out without departing from the principles of the present invention, which is intended to be limited only by the scope of the appended claims, as interpreted according to the principles of patent law.

The invention claimed is:

1. A method for manufacturing a vehicular slider window assembly, the method comprising:
   providing at least one fixed window panel, the at least one fixed window panel defining an opening;
   attaching an upper rail and a lower rail at the at least one fixed window panel;
   providing a perimeter seal having elongated sealing portions that comprise an elongated upper sealing portion, an elongated lower sealing portion, a first elongated side sealing portion and a second elongated side sealing portion, with adjacent ends of the elongated sealing portions joined to form respective corner regions of the perimeter seal;
   wherein each of the elongated sealing portions comprises a base portion, an elongated sealing lip along the respective base portion, and an attachment element along the respective base portion;
   adhesively attaching the attachment element of each elongated sealing portion of the perimeter seal at a surface of the at least one fixed window panel so the perimeter seal circumscribes the opening;
   sealing the corner regions at the at least one fixed window panel via dispensing a sealant through a passageway formed at an end of the base portion of respective ones of the elongated sealing portions at the respective corner regions to fill a gap between adjacent end regions of the respective attachment elements at the respective corner regions at the surface of the at least one fixed window panel;
   movably disposing a movable window panel at the upper rail and the lower rail, wherein the movable window panel is movable between a closed position, where the movable window panel is disposed at the opening, and an opened position, where the movable window panel is disposed at least partially along the at least one fixed window panel from the closed position; and
   wherein the elongated sealing lips of the perimeter seal are configured to seal against a surface of the movable window panel about a periphery of the movable window panel when the movable window panel is in the closed position.

2. The method of claim 1, wherein dispensing the sealant comprises dispensing the sealant via positioning a nozzle at an access end of the respective passageway at a side of the respective perimeter seal opposite from the respective attachment element.

3. The method of claim 2, comprising robotically positioning the nozzle at the access end of the respective passageway.

4. The method of claim 2, wherein each passageway has a tapered opening or access port extending from the side of the respective perimeter seal that is opposite from the respective attachment element and toward the respective attachment element.

5. The method of claim 1, wherein dispensing the sealant comprises dispensing a predetermined amount of sealant through the respective passageway, and wherein the predetermined amount of sealant is configured to fill the gap at the respective corner region without spilling onto a visible portion of the at least one fixed window panel.

6. The method of claim 1, wherein each passageway is formed through one end region of one selected from the group consisting of (i) the upper elongated sealing portion and (ii) the lower elongated sealing portion.

7. The method of claim 1, wherein providing the perimeter seal comprises forming the perimeter seal via a two shot injection molding process, and wherein the two shot injection molding process comprises a first molding process, where the respective base portions are formed via injection molding, and a second molding process, where the respective sealing lips are formed along the respective base portions via injection molding.

8. The method of claim 1, wherein the passageway at the respective corner region of the perimeter seal fluidly connects a respective opening at a side of the perimeter seal opposite from the respective attachment element and the surface of the at least one fixed window panel at the respective gap.

9. The method of claim 1, wherein, with the attachment elements adhesively attached at the surface of the at least one fixed window panel, the attachment elements attach a first side of the perimeter seal at the surface of the at least one fixed window panel, and wherein, with the attachment elements adhesively attached at the surface of the at least one fixed window panel, the first side of the perimeter seal faces the surface of the at least one fixed window panel and a second side of the perimeter seal that is opposite the first side faces away from the surface of the at least one fixed window panel and is spaced from the surface of the at least one fixed window panel.

10. The method of claim 9, wherein, with the attachment elements adhesively attached at the surface of the at least one fixed window panel, each of the respective passageways formed through the base portion of the respective elongated sealing portions at the respective corner regions extends from a respective opening at the second side of the perimeter seal and through the respective base portion at the respective corner region toward the surface of the at least one fixed window panel.

11. The method of claim 10, wherein each opening at the second side of the perimeter seal comprises a tapered opening.

12. The method of claim 10, wherein the respective passageway at each of the corner regions of the perimeter seal fluidly connects the respective opening at the second side of the perimeter seal and the surface of the at least one fixed window panel at the respective gap.

13. The method of claim 1, wherein the at least one fixed window panel comprises first and second fixed window panels defining the opening therebetween.

14. The method of claim 13, wherein adhesively attaching the perimeter seal at the surface of the at least one fixed window panel comprises adhesively attaching the perimeter seal at respective surfaces of the first and second fixed window panels and at respective surfaces of an upper appliqué and a lower appliqué so as to circumscribe the opening.

15. The method of claim 14, wherein the upper rail comprises an upper rail attachment portion that adhesively attaches at the at least one fixed window panel and at the upper appliqué, and wherein the perimeter seal is adhesively attached at respective surfaces of the first and second fixed window panels and at the upper rail attachment portion at the upper appliqué.

16. The method of claim 15, wherein the elongated upper sealing portion is adhesively attached to at least a portion of the upper rail attachment portion, and wherein the elongated lower sealing portion, the first elongated side sealing portion, and the second elongated side sealing portion are adhesively attached at respective surfaces of the first and second fixed window panels.

17. The method of claim 16, wherein the attachment elements of the respective first and second elongated side sealing portions and elongated upper sealing portions are spaced from one another at the respective corner regions such that the respective gaps are (i) between the adjacent end regions of the respective attachment elements of the respective first and second elongated side sealing portions and elongated upper sealing portions, and (ii) between the attachment elements of the first and second elongated side sealing portions and end regions of the upper rail attachment portion.

18. The method of claim 15, wherein the lower rail comprises a lower rail attachment portion that adhesively attaches at the first and second fixed window panels and at the lower appliqué, and wherein the elongated upper sealing portion is adhesively attached to at least a portion of the upper rail attachment portion, the elongated lower sealing portion is adhesively attached to at least a portion of the lower rail attachment portion, and the first and second elongated side sealing portions are adhesively attached at the respective surfaces of the first and second fixed window panels.

19. The method of claim 18, wherein the attachment elements of the respective first and second elongated side, elongated upper, and elongated lower sealing portions are spaced from one another at the respective corner regions such that respective gaps are (i) between the adjacent end regions of the respective attachment elements of the first and second elongated side, elongated upper, and elongated lower sealing portions, and (ii) between the attachment elements of the first and second elongated side sealing portions and end regions of the upper and lower rail attachment portions.

20. The method of claim 1, wherein the at least one fixed window panel comprises a single fixed window panel having the opening therethrough, and wherein the perimeter seal is adhesively attached at the single fixed window panel so as to circumscribe the opening.

21. The method of claim 1, wherein the elongated sealing lip of the elongated upper sealing portion comprises a single sealing lip, and wherein the elongated sealing lip of the elongated lower sealing portion comprises a single sealing lip.

22. The method of claim 21, wherein the elongated sealing lip of the second elongated side sealing portion comprises a single sealing lip configured to engage the movable window panel when the movable window panel is in the closed position.

* * * * *